United States Patent [19]

Bake et al.

[11] Patent Number: 4,577,872

[45] Date of Patent: Mar. 25, 1986

[54] VALVE STEM SEAL WITH MULTIPLE RING MEANS

[75] Inventors: Earl A. Bake, Pittsburgh; Clair W. Hartle, Jr., Monroeville, both of Pa.

[73] Assignee: Rockwell International Corporation, Pittsburgh, Pa.

[21] Appl. No.: 774,622

[22] Filed: Sep. 10, 1985

Related U.S. Application Data

[63] Continuation of Ser. No. 637,186, Aug. 2, 1984, abandoned.

[51] Int. Cl.[4] .................. F16J 15/06; F16J 15/30; F16K 41/04
[52] U.S. Cl. ........................ 277/12; 277/112; 277/125; 277/188 A; 277/901; 277/DIG. 6; 251/214; 251/368
[58] Field of Search ............ 277/12, 32, 112, 123-125, 277/188 R, 188 A, 901, DIG. 6; 251/214, 312, 368

[56] References Cited

U.S. PATENT DOCUMENTS

| | | | |
|---|---|---|---|
| 2,571,560 | 10/1951 | Gale | 277/112 X |
| 2,696,363 | 12/1954 | Monson | 251/214 X |
| 2,844,393 | 7/1958 | Jensen | 277/123 X |
| 2,973,978 | 3/1961 | Oppenheim | 277/188 A |
| 3,097,990 | 7/1963 | Holly | 277/DIG. 6 |
| 3,108,018 | 10/1963 | Lewis | 277/DIG. 6 |
| 3,983,900 | 10/1976 | Airhart | 251/214 X |
| 4,006,881 | 2/1977 | Gaillard | 251/214 |
| 4,156,529 | 5/1979 | Hafele | 251/214 X |
| 4,256,317 | 3/1981 | Havens et al. | 277/124 X |
| 4,306,728 | 12/1981 | Huperz et al. | 277/125 |
| 4,406,469 | 9/1983 | Allison | 277/DIG. 6 |
| 4,408,767 | 10/1983 | Kako | 277/DIG. 6 |
| 4,443,517 | 4/1984 | Shah | 277/DIG. 6 |

Primary Examiner—Robert S. Ward

[57] ABSTRACT

A seat for a valve stem comprised of two spaced rings of carbon fiber coated with a dispersion of polytetrafluoroethylene between which is interposed a ring of polytetrafluoroethylene.

5 Claims, 2 Drawing Figures

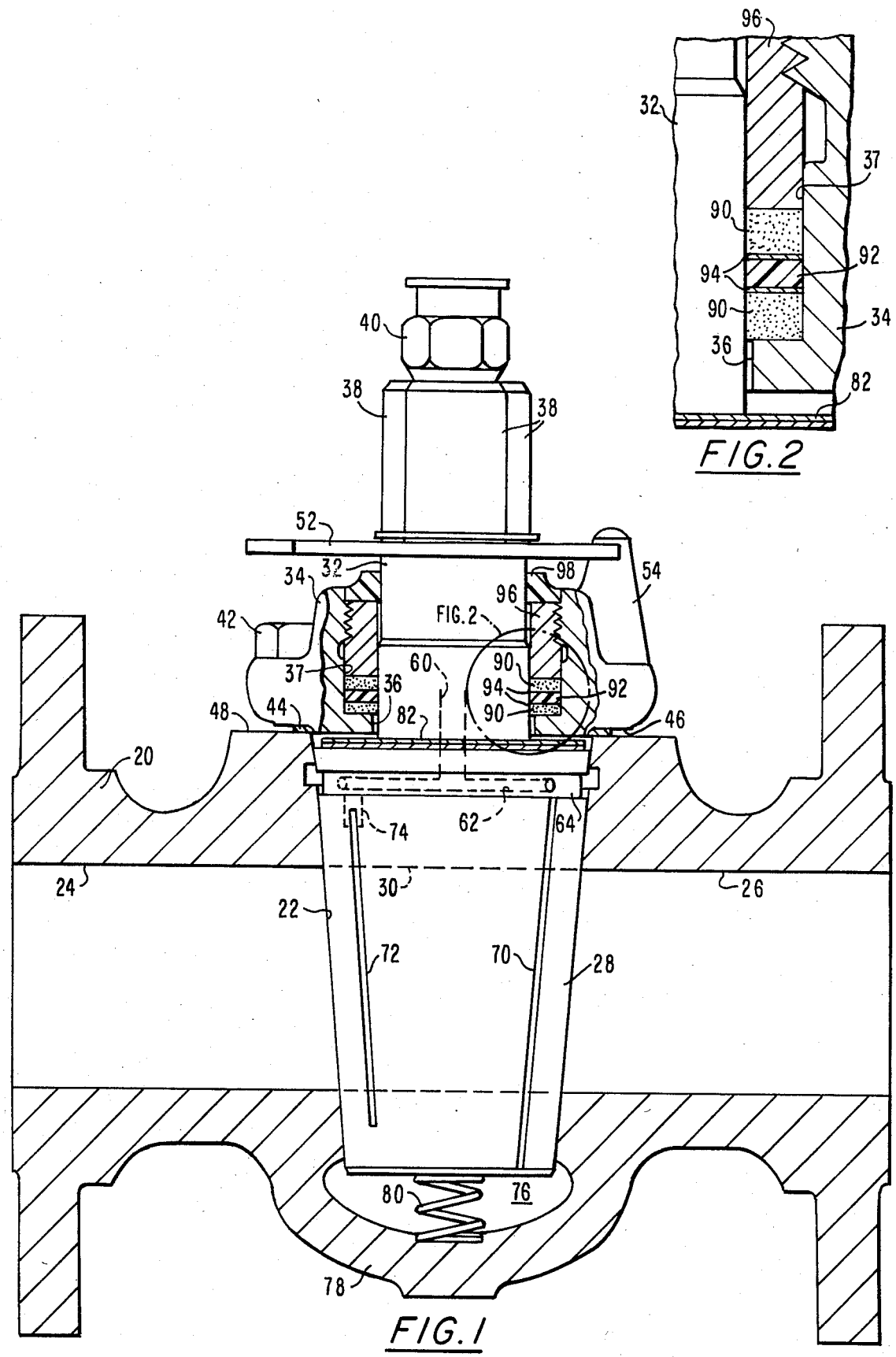

VALVE STEM SEAL WITH MULTIPLE RING MEANS

This application is a continuation of application Ser. No. 637,186, filed Aug. 2, 1984 and now abandoned.

BACKGROUND OF THE INVENTION

Field of the Invention

This invention relates to seals for the stems of valves, particularly plug valves.

DESCRIPTION OF THE PRIOR ART

Valves of the type with which this invention is concerned, namely plug valves, are subjected to wide variations of fluid pressure and temperature in service. Moreover, by their nature, they require relatively large turning torques, particularly when under pressure, in order to operate the valve between open and closed positions. Therefore, the stem seals of such valves must not only be capable of preventing leaks along the stem from the interior to the exterior of the valve under varying conditions of pressure and temperature, it is also important that they impose the minimum resistance to rotational movement of the stem.

Ideally, therefore, such a stem seal should provide a good fluid tight radial seal between the stem and the cover or body of the valve, the seal itself must be impermeable to the leakage of fluid through it, the seal should be abrasion resistant, that is, it should not be easily abradable by the metal surface of the stem, or foreign particles that might become lodged between the stem and seal, it should provide resistance to deterioration under high temperatures and it should resist or minimize electrolytic action between the metal stem and the seal, so as to minimize electrolytic corrosion. In addition to the foregoing, the seal should minimize the frictional resistance to rotation of the valve stem.

The instant invention provides a multiple element stem seal which for the first time achieves all these desirable advantages to a degree heretofore unknown. The seal is comprised of two vertically spaced rings made of a carbonaceous material such as carbon fiber or graphite, carbon fiber being preferred. The rings are coated with a dispersion of polytetrafluoroethylene (PTFE) with a latex binder used to enhance the binding between the PTFE and carbon fiber. A separate ring made entirely of PTFE is interposed between the two coated carbon fiber rings. Also interposed between the PTFE ring and each of the carbon rings is a thin ring of zinc to inhibit electrolytic action.

The properties and the usefulness of various forms of carbon and PTFE as seal elements as well as the use of zinc to counteract the effects of electrolytic action have long been known in the prior art. Thus, U.S. Pat. No. 4,006,881 teaches the use of carbon fibers with expanded graphite in valve stem seals to provide resistance to deterioration under high temperatures. U.S. Pat. No. 3,825,221 shows a V-section packing ring for a valve stem made of PTFE; U.S. Pat. No. 4,379,557 utilizes packing rings made of graphite reinforced with a metal mesh to provide a high temperature resistant seal, while in U.S. Pat. No. 4,356,997 the sealing and the low friction qualities of PTFE are utilized in a stem seal comprised of a steel ring which is partially impregnated and coated with PTFE. Also, U.S. Pat. No. 4,156,529 discloses the use of the zinc rings in a valve stem seal to minimize the effects of electrolytic action.

None of the foregoing examples of the prior art, teach either singly or in combination, applicant's novel combination of elements and materials, the advantages of which will be described in detail hereinbelow.

DESCRIPTION OF THE DRAWINGS

FIG. 1 is a cross sectional elevation view of a lubricated plug valve utilizing a stem seal embodying the instant invention.

FIG. 2 is an enlargement of the seal elements enclosed within the circle of FIG. 1.

DESCRIPTION OF THE PREFERRED EMBODIMENT

Referring to the drawings, a housing comprised of a body 20 and a cover 34 has a central chamber which is defined by a tapered seat 22 formed within the body on which is rotatably mounted a tapered plug 28 having a port 30 therethrough, shown in dotted lines, which communicates with the inlet/outlet passages when the plug is in its valve open position. A stem 32 projects from the plug 28 through an opening 36 and enlarged bore 37 formed in cover 34 which is secured to the body 20 by means of a plurality of bolts 42 only one of which is shown in FIG. 1. The bore 37 is radially spaced from and coaxial with the stem to form a seal and gland receiving chamber with the stem. A metallic seal ring 44 is compressed between annular surface 46 on cover 34 and surface 48 machined on the top of the body 20.

The outer portion of the stem 32 has flat portions 38 for the reception of a wrench or other torque applying devices to facilitate rotating the stem and plug. A sealant/lubricant fitting 40 is mounted on the outer end of the stem and is adapted to receive a mating fitting on a grease gun for injecting sealant into the internal sealant system hereinafter described.

Stop collar 52 is secured to the stem midway of its length and has circumferentially spaced stop surfaces (not shown) which cooperate with a post 54 formed on the cover to limit rotation of the plug to approximately 90 degrees.

An axially extending sealant passage is formed within the stem 32, only a portion of which is shown in dotted lines at 60. At its upper end the passage 60 communicates with the interior of fitting 40 and at its lower end the passage 60 communicates with a diametrically extending passage 62 in the large end of the plug, the opposite ends of passage 62 opening into annular groove 64 formed in the outer surface of the plug 28 near its large end. Diametrically opposed grooves 70 (only one of which is shown in FIG. 1) are formed in the exterior surface of the plug and extend from the groove 64 to the bottom of the plug, where they communicate with a chamber 76 enclosed between a bottom wall portion 78 of the body 20 and the small end of the plug.

Diametrically opposed grooves 72 (only one of which is shown in FIG. 1) are also formed in the exterior surface of the plug but do not extend to either chamber 76 or the groove 64 as do grooves 70. Short bridging grooves 74 are formed on the seating surface of the body at diametrically opposed positions, one of which grooves is shown in dotted lines in FIG. 1. Grooves 74 serve to connect the grooves 72 with annular groove 64 formed in the upper portion of the plug only when the plug is in its closed position.

Lubricant/sealant is introduced into the system of grooves above described through fitting 40 and flows through passages 60, 62 into the annular groove 64. In either the open or closed position pressurized sealant-/lubricant will flow into groove 70 and into chamber 76 whereby the plug may be "jacked" away from its seat 22, all as is well known in the art. Grooves 72 are disconnected from the rest of the system as the plug moves away from its closed position so that sealant will not be expelled from the system into inlet/outlet passages 24, 26 as the grooves 72 pass the inlet/outlet passages.

A spring 80 is compressed between the wall 78 of the body and the smaller end of the plug 28 so as to constantly urge the plug axially in a direction away from the seat. At the large end of the plug shims or spacers 82 are provided whereby movement of the plug away from its seat under the influence of spring 80 is limited so that the space between the plug and its seat will at all times be that which provides an optimum thickness of lubricant/sealant film between the plug and its seat.

The seal of the instant invention is comprised of two spaced annular rings 90 made of carbon filament of fiber which has been coated with a dispersion of PTFE with a latex binder to provide good adhesion between the PTFE and the carbon filament material. Interposed between the two rings 90 is a ring 92 of PTFE and two zinc rings 94 (see FIG. 2) are interposed between the ring 92 and the two carbon fiber rings 90. An adjustable gland 96 is threaded into bore 70 to compress the rings 90, 92, 94 between the gland and the bottom of counterbore 37.

A weather seal 98 formed of any suitable elastomeric material tightly encircles the stem 32 above the gland 60 to prevent the entry of moisture and other foreign material between the stem and/or gland.

In any stem seal, there are three possible routes of fluid leakage, namely between the seal assembly and the stem, between the seal assembly and the cover and through the seal assembly itself. The ring 92 is sized to provide an interference fit both with the stem and with the bore 37, so as to provide a very close contact between the ring 92 and the stem and cover. This closeness of fit is further enhanced by the axial pressure imposed on the seal assembly by the gland 96 which compresses the seal assembly against the floor of bore 37. Since PTFE has a low coefficient of friction, the tight fit between the ring 92 and the surfaces radially adjacent to it, which is necessary for good sealing can be tolerated without imposing an unduly high resistance to rotation of the stem. Also, PTFE is a relatively impervious material and therefore, presents a barrier to the leakage of fluid through the seal assembly itself.

In the absence of rings 90 the PTFE ring 92 would tend to extrude into the space between the stem and gland 96 and between the stem and the wall of opening 36 which spaces inevitably exist when the various valve parts are manufactured to normal tolerances. The carbon filament rings 90 may be sized to have a close fit with the stem and the bore 37 which prevents extrusion of the ring 92 into these spaces under the axial load imposed by the gland 96 or the fluid pressure from within the valve.

The PTFE dispersion coating on ring 90 fills the surface irregularities and imperfections normally present in carbon filament and reduces the frictional resistance the rings 90 impose on the stem. This coating also renders the rings 90 resistant to abrasion which might be caused by the relative rotation of the stem and seal assembly over long periods of time. Additionally, the coating on rings 90 increase the impermiability of the rings so as to present additional barriers to the leakage of fluid through the seal assembly itself.

Another and important advantage of the carbon filament rings is that PTFE and other similar materials tend to deteriorate under elevated temperatures while carbon filament material remains relatively intact and stable. Thus, in the event elevated temperatures are experienced, the carbon filament rings will provide a reasonably effective seal even after the ring 92 has decomposed or deteriorated, until such a time as the valve can be removed from service and repaired.

In summary the PTFE ring provides a primary low friction seal between the cover and stem while the carbon fiber rings prevent extrusion of the PTFE rings into the space between the stem and cover (opening 36) and stem and gland, provide an additional barrier against the leakage of fluid through the seal assembly itself and additionally provide an effective radial seal between the stem and cover under elevated temperatures.

The zinc rings minimize the effects of electrolytic action so that corrosion of the stem surfaces and the surface of the bore 37 is minimized.

The instant invention therefore provides a multi-element yet relatively simple valve stem seal which provides an effective radial seal, is impervious to the leakage of fluid through the seal assembly itself, is resistant to abrasion, provides an effective seal under elevated temperatures, inhibits electrolytic corrosion, while imposing a minimum of frictional resistance to turning of the stem.

We claim:

1. A lubricated plug valve having a housing comprised of a body and cover enclosing a chamber defined by a seating surface formed in said body, a plug seated on said surface and adapted to rotate between valve open and valve closed positions, a valve stem drive connected to said plug and projecting through said housing to the exterior thereof, a bore in said housing surrounding and radially spaced from said stem to provide an annular seal receiving chamber between said stem and said housing, a stem seal comprised of first ring means of carbonaceous material coated with a dispersion of PTFE with a latex binder in radial sealing engagement with said bore and said stem, second ring means of PTFE in radial sealing engagement with said bore and said stem and an annular gland projecting into and axially adjustable in said chamber for applying an axial load on said first and second ring means.

2. The valve and stem seal defined in claim 1 in which said carbonaceous material is carbon fiber.

3. The valve and stem seal defined in claim 2 in which said first ring means is comprised of two rings and said second ring means is interposed between said two rings.

4. The valve and stem seal defined in claim 3 in which said second ring means has an interference fit between said stem and said bore, and said first ring means have a close fit between said stem and said bore to prevent extrusion of said second ring means along said stem and said bore.

5. The valve and stem seal defined in claim 4 together with third ring means of zinc interposed between each of said two rings and said second ring means.

* * * * *